US011546219B1

(12) United States Patent
Groenewald et al.

(10) Patent No.: US 11,546,219 B1
(45) Date of Patent: Jan. 3, 2023

(54) USER-DEFINED VIRTUAL REGIONS IN A CLOUD PROVIDER NETWORK

(71) Applicant: Amazon Technologies, Inc., Seattle, WA (US)

(72) Inventors: Michael Groenewald, Cape Town (ZA); Diwakar Gupta, Seattle, WA (US); Philip Cronje, Somerset West (ZA)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/863,605

(22) Filed: Apr. 30, 2020

(51) Int. Cl.
| | |
|---|---|
| *G06F 15/16* | (2006.01) |
| *H04L 41/0893* | (2022.01) |
| *H04L 41/5041* | (2022.01) |
| *H04L 41/5051* | (2022.01) |
| *H04L 67/10* | (2022.01) |

(52) U.S. Cl.
CPC ...... *H04L 41/0893* (2013.01); *H04L 41/5048* (2013.01); *H04L 41/5051* (2013.01); *H04L 67/10* (2013.01)

(58) Field of Classification Search
CPC . H04L 41/0893; H04L 41/5048; H04L 67/10; H04L 41/5051
See application file for complete search history.

(56) References Cited

U.S. PATENT DOCUMENTS

| | | | | |
|---|---|---|---|---|
| 2013/0124712 | A1* | 5/2013 | Parker | H04L 41/5051 709/224 |
| 2015/0326448 | A1* | 11/2015 | Chaudhary | G06Q 30/04 705/40 |
| 2016/0359673 | A1* | 12/2016 | Gupta | H04L 45/38 |
| 2018/0048557 | A1* | 2/2018 | Li | H04L 45/1283 |

* cited by examiner

*Primary Examiner* — Hua Fan
(74) *Attorney, Agent, or Firm* — Nicholson De Vos Webster & Elliott LLP

(57) ABSTRACT

Techniques are described for enabling users of a cloud provider network to define and use custom "virtual regions" comprised of selected sets of cloud provider network infrastructure locations. A cloud provider network enables users to obtain information about available infrastructure locations and to identify locations that satisfy a set of performance characteristics and other parameters. Once a set of desirable infrastructure locations have been identified, users can request the creation of a virtual region to be associated with their user account, where the request specifies a set of infrastructure locations to comprise the virtual region. Once a virtual region is created, users can cause computing resources to be launched into or otherwise associated with the virtual region in a manner similar to the use of existing regions and availability zones.

18 Claims, 8 Drawing Sheets

US 11,546,219 B1

USER-DEFINED VIRTUAL REGIONS IN A CLOUD PROVIDER NETWORK

BACKGROUND

Cloud computing platforms often provide on-demand, managed computing resources to customers. Such computing resources (e.g., compute and storage capacity) are often provisioned from large pools of capacity installed in data centers. Customers can request computing resources from the "cloud" and the cloud can provision compute resources to those customers. Technologies such as virtual machines and containers are often used to allow customers to securely share capacity of computer systems.

BRIEF DESCRIPTION OF DRAWINGS

Various embodiments in accordance with the present disclosure will be described with reference to the drawings, in which.

DETAILED DESCRIPTION

Figure 1:
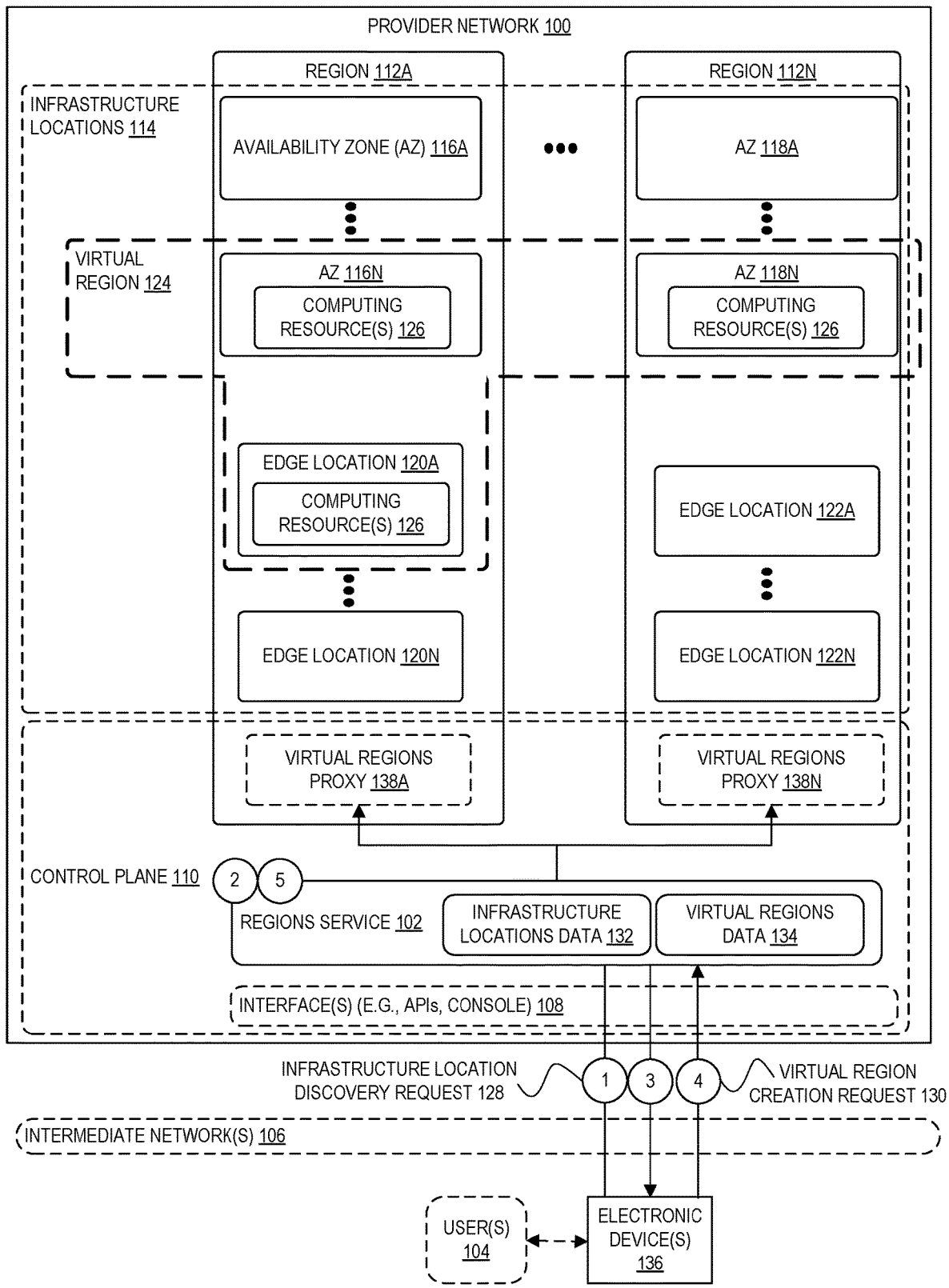
FIG. 1 illustrates an exemplary system including a cloud provider network in which users are able to create and use virtual regions of infrastructure locations provided by the cloud provider network according to some embodiments.

The present disclosure relates to methods, apparatus, systems, and non-transitory computer-readable storage media for enabling users of a cloud provider network to define and use custom "virtual regions" each comprised of a selected set of cloud provider network infrastructure locations. The infrastructure provided by a cloud provider network is typically formed as a number of "regions." A region in this context refers generally to a geographical area in which the cloud provider clusters data centers or other computing infrastructure at which users of the cloud provider network can launch various types of cloud computing resources (e.g., virtual machine (VM) instances, containers, storage resources, databases, etc.). Each region can further include multiple (e.g., two or more) availability zones (AZs) connected to one another via a private high-speed network, for example, a fiber communication connection. In some embodiments, an AZ provides an isolated failure domain including one or more data center facilities with separate power, separate networking, and separate cooling from those in another AZ. Customers connect to resources provided within the regions and AZs of a cloud provider network via publicly accessible networks (e.g., the Internet or a cellular communication network).

While the regions and AZs defined by cloud provider networks typically provide users with many options for deploying their cloud computing resources at various locations around the world, in some instances, a cloud provider network's pre-defined regions may not map exactly to a user's desired deployment and application implementation plans. For example, a user might be responsible for implementing an application that has a significant user base in a few locations that span two or more existing cloud provider network regions. As another example, the implementation of an application might be constrained by data sovereignty considerations that require the application's data to stay within one or more legal jurisdictions that do not exactly overlap with an existing region, among other possible use case criteria. In these scenarios and others, users may be burdened with managing computing resources for a single application across multiple separate regions, managing the selection of a set of regions and AZs from an ever-increasing set of options provided by a cloud provider network, managing data sovereignty constraints within a subset of a pre-defined region or across separate pre-defined regions, and so forth.

The aforementioned challenges, among others, are addressed in some embodiments by the disclosed technology for enabling users of a cloud provider network to define custom virtual regions of cloud provider network infrastructure locations. In some embodiments, an infrastructure location refers to a defined geographic location at which computing hardware exists that can be used by users of the cloud provider network to launch cloud computing resources. Infrastructure locations include, but are not limited to, traditional data centers managed by the cloud provider network and associated with predefined regions and AZs. Infrastructure locations also include various types of "edge locations" and other infrastructure representing extensions of the cloud provider network, where such extensions typically include a limited quantity of capacity (e.g., capacity provided by small data centers or other facilities of the cloud provider network located at or within other entities' data centers).

In some embodiments, to help users create virtual regions, a cloud provider network enables users to obtain information about available infrastructure locations and to identify locations that satisfy a set of performance characteristics or other specified parameters (e.g., parameters specified in terms of geographic areas or legal jurisdictions of interest, in terms of network latency relative to one or more particular geographic locations, network latency among a selected set of infrastructure locations, types of services available at particular infrastructure locations, etc.). Once a set of desired infrastructure locations have been identified, users can request the creation of a virtual region which will be associated with their user account, where the request specifies the set of infrastructure locations that will comprise the virtual region (or that specifies a set of infrastructure location criteria that can be used by the cloud provider network to automatically select a set of infrastructure locations to comprise the virtual region). Once a virtual region is created, users can cause computing resources (e.g., VMs, containers, subnets, etc.) to be launched into or otherwise associated with the virtual region in a manner similar to the use of existing regions and AZs. In some embodiments, a user's virtual region is associated with a unique resource identifier space that enables users to manage the resources associated with a virtual region separately from the existing regions and AZs in which the computing resources may be located.

FIG. 1 illustrates an exemplary system including a cloud provider network comprised of various infrastructure locations grouped into regions and AZs, and in which users can define custom virtual regions of infrastructure locations, according to some embodiments. A cloud provider network 100 (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") (e.g., user(s) 104) of provider networks 100 may utilize one or more user accounts that are associated with a customer account, though these terms may be used somewhat interchangeably depending upon the context of use. Users may interact with a provider network 100 across one or more intermediate networks 106 (e.g., the internet) via one or more interface(s) 108, such as through use of application programming interface (API) calls, via a console implemented as a website or application, etc. The interface(s) 108 may be part of, or serve as a front-end to, a control plane 110 of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

As illustrated in FIG. 1, a cloud provider network 100 is formed as a number of regions (e.g., region 112A, . . . , region 112N), where a region is a geographical area in which the cloud provider clusters data centers or otherwise includes one or more infrastructure locations 114. Each region can include multiple (e.g., two or more) availability zones (AZs) (e.g., AZ 116A, . . . , AZ 116N within region 112A and AZ 118A, . . . , AZ 118N within region 112N) connected to one another via a private high-speed network, for example, a fiber communication connection. In some embodiments, an AZ provides an isolated failure domain including one or more data center facilities with separate power, separate networking, and separate cooling from those in another AZ. AZs within a region are positioned far enough away from one other that a same natural disaster (or other failure-inducing event) should not affect or take more than one AZ offline at the same time in most instances. Customers can connect to AZs of the cloud provider network via a publicly accessible network (e.g., the Internet, a cellular communication network). Some cloud provider networks 100 are expanding the definition of a traditional availability zone to include new kinds of "provider substrate extension" or "edge" locations (e.g., edge location 120A, . . . , edge location 120N associated with region 112A, and edge location 122A, . . . , 122N associated with region 112N)— including, for example, near zones (e.g., zones associated with disconnected control planes), 5G-enabled wavelength zones (connected to carrier networks, etc.), etc. In some embodiments, some or all edge locations may be further grouped into one or more availability groups, edge zones, or other logical groupings.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

For example, in various embodiments, a "serverless" function may include code provided by a user or other entity—such as the provider network itself—that can be executed on demand. Serverless functions may be maintained within provider network 100 by an on-demand code execution service and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute instance, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

To enable users to discover infrastructure locations available for use within a cloud provider network, and to define custom virtual regions of infrastructure locations, a cloud provider network includes APIs, web-based graphical user interfaces (GUIs), and other possible interfaces that can be used to query infrastructure location information, to select infrastructure locations for inclusion in a virtual region, and to deploy computing resources at infrastructure locations within a defined virtual region. Furthermore, once created, users can add virtual private networks and subnets to virtual regions and perform other actions typically performed relative to traditional regions and availability zones of a cloud provider network. In some embodiments, the APIs enabling querying of infrastructure locations provide both static and dynamic information about infrastructure locations (including, e.g., types of capabilities supported by each infrastructure location, types of cloud provider services supported by each infrastructure location, latency information associated with each infrastructure location, capacity availability within each infrastructure location, etc.).

In FIG. 1, the numbered circles "1"-"7" in FIG. 1 illustrate a process that includes a user 104 requesting information about infrastructure locations offered by a cloud provider network 100, creating a virtual region 124 for use by a user account associated with the user, and launching computing resource(s) 126 into the virtual region (e.g., at an AZ 116A, edge location 120A, and AZ 118A). At circle "1" in FIG. 1, a user generates an infrastructure location discovery request 128 to obtain information about infrastructure locations offered by a cloud provider network 100. As indicated above, communications between electronic device(s) 136 and the provider network 100 can be routed through interface(s) 108, such as through use of application programming interface (API) calls, via a console implemented as a website or application, and so forth. In addition to serving as a frontend to control plane services, the interface(s) 108 can perform operations such as verifying the identity and permissions of the user initiating a request, evaluating the request and routing it to the appropriate control plane services, and the like.

In some embodiments, the request includes location parameters such as, for example, a maximum latency of data communications relative to a specified geographic area, types of available cloud provider network services, or identifiers of one or more legal jurisdictions. For example, an infrastructure location discovery request might request locations within the European Union and that have no more than a 50 millisecond latency to London, or locations in the United States that provide a particular type of service or that have connectivity to a particular 5G network, and the like.

In some embodiments, at circle "2," a regions service 102 processes the request 128 and returns information about infrastructure locations satisfying the user request. For example, the regions service 102 can return information about all infrastructure locations or about only select infrastructure locations 114 matching user-specified criteria, as described above. In some embodiments, the regions service 102 stores and maintains infrastructure locations data 138 including information about each of the available infrastructure locations 114 such as, for example, an identifier of each infrastructure location, latency information for each infrastructure location relative to other infrastructure locations and to particular geographic locations, types of services available at each infrastructure location, an amount of computing resource capacity available at each infrastructure location, an expected amount of scalability at each infrastructure location, and the like.

In some embodiments, an infrastructure location describe request 128 can include an action name indicating that information about infrastructure locations offered by the cloud provider network 100 is desired (e.g., "csp describe-infrastructure-locations") and other possible parameters related to desired criteria for infrastructure locations, as described above. The criteria may include, for example, indications of particular types of infrastructure locations of interest, indications of particular geographic areas or legal jurisdictions of interest, indications of a desired latency profile relative to one or more specified locations, and the like. The following is an example format for a describe infrastructure locations request including a filter parameter indicating a legal jurisdiction of interest (e.g., the European Union):

--- csp describe-infrastructure-locations --jurisdictions {european-union}

---

In some embodiments, at circle "3," the response to a describe infrastructure locations request can include information about traditional regions and availability zones as well as other types of infrastructure locations such as edge locations. In some embodiments, the information returned about each infrastructure location can include any of: a name or identifier of the infrastructure location, an existing region with which the infrastructure location is associated, a legal jurisdiction in which the infrastructure location is located, a cloud provider network-specific identifier of the infrastructure location, identifiers of one or more cloud provider services available for use within the infrastructure location, a latency profile for the infrastructure location relative to one or more defined geographic areas or to other infrastructure locations, an indication of available capacity at the infrastructure location, an indication of scalability at the infrastructure location (e.g., an indication that a user would likely be able scale a particular workload up to 5× or 10× at a particular infrastructure location, etc.), and an indication of one or more types of networks accessible to the infrastructure location (e.g., the Internet, 5G networks, etc.). This information can be used, for example, to help users identify infrastructure locations that satisfy criteria of interest.

At circle "4" in FIG. 1, a user generates a virtual region creation request 130. For example, a user can use a console or other interface to generate a virtual region creation request 130. In some embodiments, a virtual region creation request 130 includes identifiers of a plurality of infrastructure locations associated with the cloud provider network to be included in the virtual region (e.g., identifiers of AZ 116N, AZ 118N, and edge location 120A in the example of virtual region 124 in FIG. 1). In other embodiments, a virtual region creation request 130 includes location criteria and the corresponding infrastructure locations are identified automatically by the regions service 102. For example, the location criteria can include any of: a legal jurisdiction in which the plurality of infrastructure locations are located, a latency profile for the plurality of infrastructure locations relative to a geographic location, a type of cloud provider network service available at the plurality of infrastructure locations, or any other criteria. The regions service 102 can then search the infrastructure locations data 132 for locations satisfying the criteria and include those regions in a virtual region 124 created for the user.

In some embodiments, the creation of a virtual region results in the creation and configuration of regional load balancers bound to a virtual region's fully qualified domain name. For example, a virtual region consisting of infrastructure locations in a first region and a second region regions may result in the creation of a load balancer in each region. In some embodiments, DNS routing is used to intelligently route clients to an appropriate endpoint (e.g. latency-based routing, or simple round-robin routing).

In some embodiments, the load balancers described above communicate with a virtual region proxy service (e.g., including virtual regions proxies 138A-138N), which is responsible for translating request elements specific to the virtual region to the underlying region's equivalent, and vice versa for response elements. A virtual regions proxy, for example, can be used to create an endpoint within a region at which requests associated with a virtual region can be communicated and translated into identifiers and operations associated with the associated cloud provider network region. For example, requests that identify computing resource using an identifier associated with a virtual region can be translated into an identifier understood by components in the underlying region. Furthermore, the virtual regions proxies can be used to manage various cross-region capabilities (e.g., the ability to copy machine images and other resources across region, to replicate stored data across regions, etc.), and to forward requests among regions in instances where computing resources are unable to span two or more regions. In this manner, the control planes and other components of the existing regions can be largely unaware of the existence of the abstracted virtual regions used by some users of the provider network 100.

As an example, consider a machine image identifier associated with a virtual region (e.g., "mi-v-1234"), which is how an associated customer addresses the machine image in API requests. In a first region comprising the virtual region, the corresponding underlying machine image identifier is "mi-1a2b," while in a second region it is "mi-3c4d." In some embodiments, the proxy service described above perform the translation from the virtual region identifiers to underlying region identifiers transparently. In other embodiments, some services provided by the provider network 100 may be able to support the concept of a virtual region, and associated identifiers, natively, in which case the proxy service is not needed to perform such translations. In some embodiments, to support such translation features, the proxy service includes a cross-region state component that maintains consistent virtual identifiers for a given virtual region across all of its endpoints.

In some embodiments, at circle "5," a region service 102 processes the virtual region creation request 130 by storing virtual region data 134 in association the user's account, where the virtual region data includes identifiers of the infrastructure locations comprising the virtual region, among other possible information. In some embodiments, the region service 102 further sends a response including a virtual region identifier of the created virtual region 124 that can be used to launch computing resources in the virtual region 124 and to perform other virtual region management operations. Once created, the user can optionally request additional information about the virtual region 124, launch supported types of computing resources into the virtual region 124, use launch templates to launch computing resources into the virtual region 124, associate auto scaling policies with the virtual region 124, among other possible actions.

In some embodiments, at least one infrastructure location of a created virtual region is associated with a first region defined by the provider network 100 and at least one other infrastructure location of the created virtual region is associated with a second, different region defined by the provider network 100. For example, the example virtual region 124 in FIG. 1 includes at least one infrastructure location associated with a region 112A and at least one infrastructure location associated with a region 112N (and possibly other infrastructure locations associated with other regions). In this manner, virtual regions can be comprised of infrastructure locations spanning any number of underlying predefined regions of the provider network 100.

Figure 2:
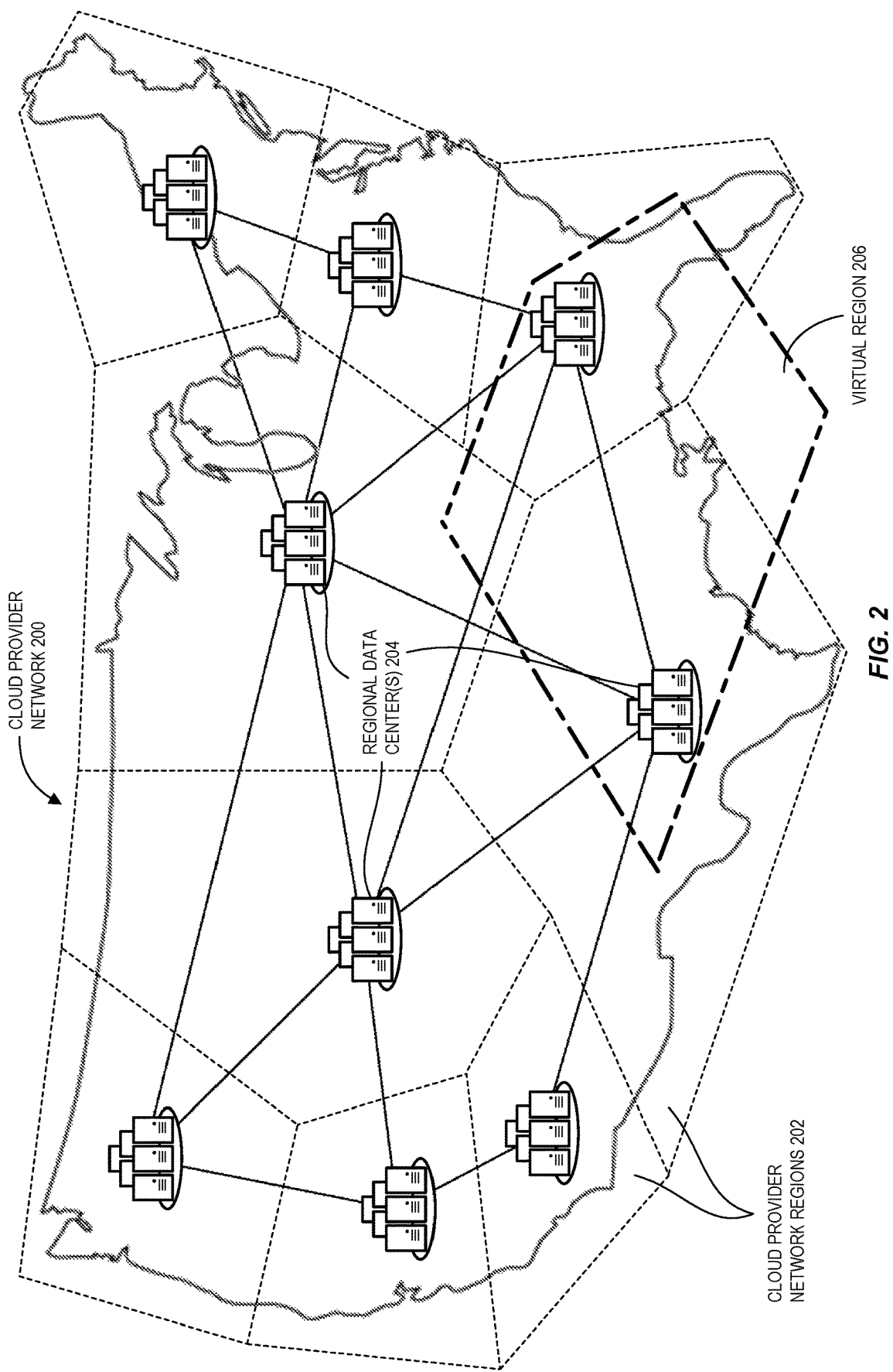
FIG. 2 illustrates a partial geography of an exemplary cloud provider network including a plurality of cloud provider network-defined regions and an example user-defined virtual region according to some embodiments.

FIG. 2 illustrates the partial geography of an exemplary cloud provider network including a plurality of cloud provider network-defined regions and an example user-defined virtual region according to some embodiments. As illustrated, the cloud provider network 200 includes a plurality of predefined regions 202, each including some number of data centers 204 and possibly other infrastructure locations. The example shown in FIG. 2 illustrates that a created virtual region 206 can include infrastructure locations spanning at least two separate predefined regions 202 of the provider network 200.

In some embodiments, a regions service 102 creates a unique identifier space for a created virtual region 124. Computing resources launched within or otherwise associated with the virtual region 124 are assigned identifiers from the unique identifier space (e.g., based on a unique identifier prefix associated with the virtual region) regardless of the underlying infrastructure location at which the computing resource is executing or associated with. For example, if a user request to launch a computing resource 126 into the virtual region 124, the computing resource may be deployed within AZ 118N but assigned a resource identifier that from the identifier space associated with the virtual region 124 (e.g., instead of an identifier from an identifier space associated with the AZ 118N or region 112N as might occur in the absence of the virtual region 124). In this manner, users can obtain information about the computing resources associated with a given virtual region even though the computing resources may be spread across any number of underlying infrastructure locations and regions. As indicated above, in some embodiments, virtual region proxies can be used to translate identifiers from a virtual region identifier space to identifiers recognizable by a control plane and other components of any given existing cloud provider network region.

In some embodiments, once a virtual region 124 is created, users can add or remove infrastructure locations from the virtual region. For example, if a user desires to use one or more additional infrastructure locations in association with a previously created virtual region 124, the user can generate a request sent to the regions service 102 to add the one or more infrastructure locations. The regions service 102 can then modify the virtual regions data 134 for the existing virtual region to further include the additional infrastructure locations. In some embodiments, users can similarly remove infrastructure locations included as part of an existing virtual region. In this example, if an infrastructure location requested for removal includes any user computing resources, the regions service 102 can cause the resources to be migrated or re-associated with another infrastructure location that is part of the virtual region. In some embodiments, a user can generate a request to substitute one infrastructure location for another infrastructure location in a virtual region, in which case resources may also be migrated or re-associated with a new infrastructure location as needed.

In some embodiments, users can launch compute instances and other computing resources into a virtual region based on an application profile or other description of performance characteristics for a workload. For example, an application profile can specify performance characteristics for an application or workload in terms of CPU, memory, networking, latency, or other characteristics. In this example, in response to requests to launch compute instances based on an application profile, a hardware virtualization service can select an infrastructure location and compute instance type that satisfies the application profile performance characteristics.

In some embodiments, users can request the inclusion of geographic areas into a virtual region that that do not currently include any usable infrastructure. In some embodiments, a cloud provider network 100 can collect and analyze such requests and, in some cases, deploy infrastructure to geographic locations for which a threshold interest has been specified.

Figure 3:
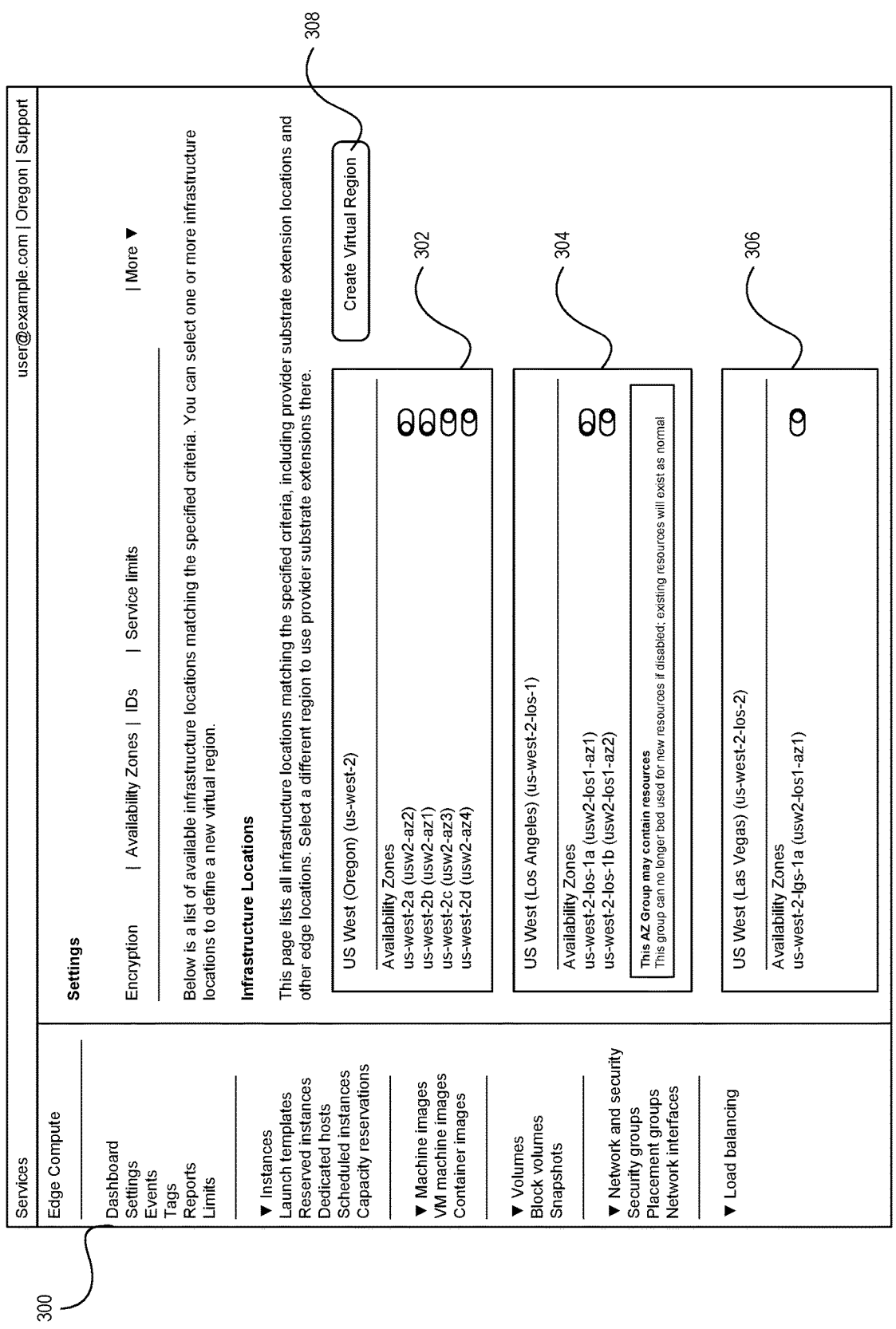
FIG. 3 illustrates an example graphical user interface (GUI) with which a user can view information about various infrastructure locations and can select infrastructure locations desired for inclusion in a virtual region according to some embodiments.

FIG. 3 illustrates an example GUI in which a user can obtain information about various infrastructure locations in the process of defining a custom virtual region according to some embodiments. As illustrated, the interface 300 includes an interface elements 302, 304, and 306, each displaying a list of infrastructure locations satisfying a previously received infrastructure location discovery request. For example, the interface element 302 displays a list of infrastructure locations within a particular region, each of which can be selected for inclusion in a virtual region (e.g., by toggling the slider buttons to the right of each infrastructure location). The interface 300 further includes an interface elements 304 and 306 each displaying infrastructure locations associated with an "availability group" comprising a set of edge locations. The example interface 300 further includes a create virtual region button 308 that can be used to generate a virtual region creation request based on a selected set of infrastructure locations, as described above. In some embodiments, a cloud provider network 100 provides "wizard" user interfaces that help guide a user through the process of identifying and selecting infrastructure locations to comprise a virtual region based on input obtained from the user related to their desired use case.

Figure 4:
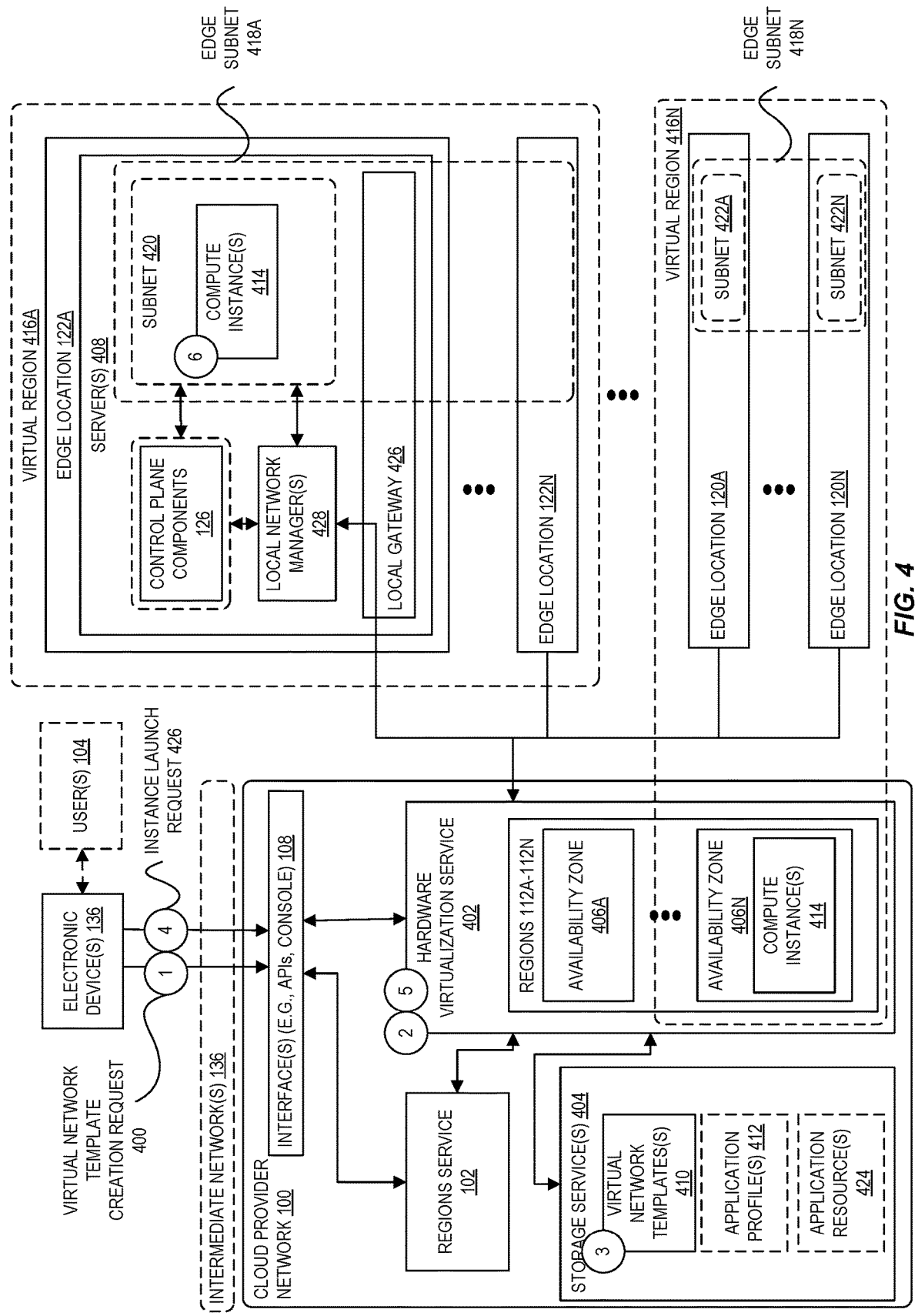
FIG. 4 is a diagram illustrating a networked computing environment in which users create virtual network templates used to group computing resources at one or more infrastructure locations of a virtual region according to some embodiments.

FIG. 4 is a diagram illustrating an environment in which users create virtual network templates used to logically group computing resources at infrastructure locations comprising a virtual region according to some embodiments. In FIG. 4, the numbered circles "1"-"6" illustrate a process that includes a user creating a virtual network template for a virtual network into which the user desires to deploy computing resources at one or more infrastructure locations of a virtual region (e.g., at any of virtual region 416A, . . . , virtual region 416N), a user sending a request to launch one or more compute instances into the virtual network defined by the template, and the cloud service provider causing the configuration of various virtual network-related resources to launch the compute instances. The environment illustrated in FIG. 4 also shows the optional configuration of various edge subnets 418A-418N, each of which may span one or more infrastructure locations. In some embodiments, such edge subnets may be used as a logical representation of one or more respective underlying subnets associated with particular infrastructure locations. For example, a user may create a virtual network template to specify networking and security configurations for an isolated virtual network used to group resources deployed within a cloud provider network 100, within one or more provider substrate extensions, or combinations thereof.

At circle "1" in FIG. 4, a user generates a request 400 to create a virtual network template. As indicated above, communications between electronic device(s) 136 and the provider network 100, such as a request to create a virtual network template, can be routed through interface(s) 108, such as through use of application programming interface (API) calls, via a console implemented as a website or application, and so forth. In addition to serving as a frontend to control plane services, the interface(s) 108 can perform operations such as verifying the identity and permissions of the user initiating a request, evaluating the request and routing it to the appropriate control plane services, and the like. In some embodiments, at circle "2," a hardware virtualization service 402, or other service of the cloud provider network 100, processes the request 400 and, at circle "3," stores a resulting virtual network template in association with a user account generating the request (e.g., as a data object including the specified template parameter values and stored as part of virtual network templates 410 at a storage service 404 or other storage location). In some embodiments, the data object is stored in association with a user account that initiated the request. In other embodiments, the data object is stored in association with a separate user account (e.g., a "shadow" account) and the user account that initiated the request is granted read-only access to the data object associated with the separate user account. A shadow account may be an account owned by a service of the cloud provider network 100, where the shadow account holds resources that are accessible to the customer but not managed by the customer, and into which the customer may have limited visibility. A shadow account for edge location networks can be created on a per-customer basis. With respect to virtual networks, the usage of a shadow account can enable customers to access edge locations without exposing the precise number and location of the edge locations. This can beneficially remove the burden of managing a large number of sites from the customer and can also prevent customers of the cloud provider from gaining insight into the geographic layout of the actual network infrastructure. In some embodiments, the hardware virtualization service 402 generally enables users to manage the deployment of compute instances to infrastructure locations that are part of a virtual region.

In some embodiments, one parameter value that can be included in a virtual network template creation request 600 is a value indicating a CIDR range to use for the virtual network (e.g., IPv4/16, etc.). As indicated above, the specified CIDR range may be subdivided by the hardware virtualization service 402 for use within various automatically created subnets at provider substrate extension locations (e.g., subnet 420 associated with edge location 122A, and subnets 422-422N associated with edge locations 120A-120N). Other example parameter values that can be included in a virtual network template creation request 400 include values related to a routing posture of the virtual network (e.g., values used to define route table configurations, used to configure various types of gateways, etc.). Yet other example parameter values that can be included in a virtual network template creation request 400 include network NACL templates or other security rules used to define stateless firewall rules. Another example parameter value that can be included in a virtual network template creation request 400 includes identifiers of security group profiles used to configure network settings for relevant subnets.

The following is an example format for a request used to create a virtual network for computing resources to be deployed at provider substrate extension locations:

```
csp create-virtual-edge-network
--region my-virtual-region
--vn-id my_vn
--cidr-blocks 10.0.0.0/24
(returns a virtual- -network-id that can be used for future API calls)
```

In some embodiments, upon a hardware virtualization service 402 receiving a virtual network template creation request 400, the service may configure some or all the configurations specified in the template relative to relevant infrastructure locations (e.g., relative to infrastructure locations that are part of a virtual region 416A or 416N identified in the template, or that satisfy other criteria in the template). For example, the hardware virtualization service 602 may proactively create subnets for infrastructure locations within the identified virtual region specified in the template creation request, configure route tables, security groups, and other configurations at those locations, and so forth. In other embodiments, the corresponding resources may not be created and configured until a user requests the launch of a compute resource into the virtual network defined by the template, as described below, such that the underlying virtual network resources are created "just in time" relative to instance launch requests.

As indicated above, once a virtual network template has been defined by a user, users can launch compute instances and other resources into the virtual network by identifying the virtual network (e.g., based on a virtual network identifier returned by the request), and optionally further identifying an application profile for the instances to be launched (where an application profile may further identify application resource(s) 414 to be used to launch the instances). For example, at circle "4" in FIG. 6, a user causes the generation of a workload launch request 426 to launch N number of instances based on an identified application profile into an identified virtual network associated with a virtual network template, where N may correspond to a number of instances to be launched satisfying the constraints of the application profile. In other embodiments, a user can cause generation of a request to launch N instances without specifying an application profile (e.g., "run-instances [--virtual-network-id<value>]").

Similar to the virtual network template creation request 400 described above, communications between electronic device(s) 136 and the provider network 100, such as a request to launch one or more instances into a virtual network, can be routed through interface(s) 108, such as through use of application programming interface (API) calls, via a console implemented as a website or application, and so forth. In addition to serving as a frontend to control plane services, the interface(s) 108 can perform operations such as verifying the identity and permissions of the user initiating a request, evaluating the request and routing it to the appropriate control plane services, and the like.

In some embodiments, at circle "5," such launch requests are received by a hardware virtualization service 602, which may include several components (e.g., a placement manager, network manager, and storage manager, etc.) that are used to collectively identify one or more infrastructure locations within the associated virtual region at which compute instances can be launched to satisfy the parameters identified in an identified application profile or in request itself. The number of identified infrastructure locations may depend on a large number of constraints specified in an identified application profile as indicated above. Once identified, if an edge location is identified as a location to launch a compute instance, the hardware virtualization service 402 sends instructions to a local network manager 428 at a edge location requesting the launch of the instances (e.g., compute instances 414, in addition to associated resources such as volume(s) or other resources). In some embodiments, at circle "6," the requested instances can then be launched at one or more servers 408 within the edge location and further associated with a subnet (e.g., compute instances 414 associated with a subnet 420 based on an assignment of an IP address in the subnet range to a virtual adapter associated with the instance). In other examples, if the compute instance is to be launched at any of regions 112A-112N of the cloud provider network 100, the instructions to launch the template are sent to infrastructure within the corresponding region(s).

Figure 6:
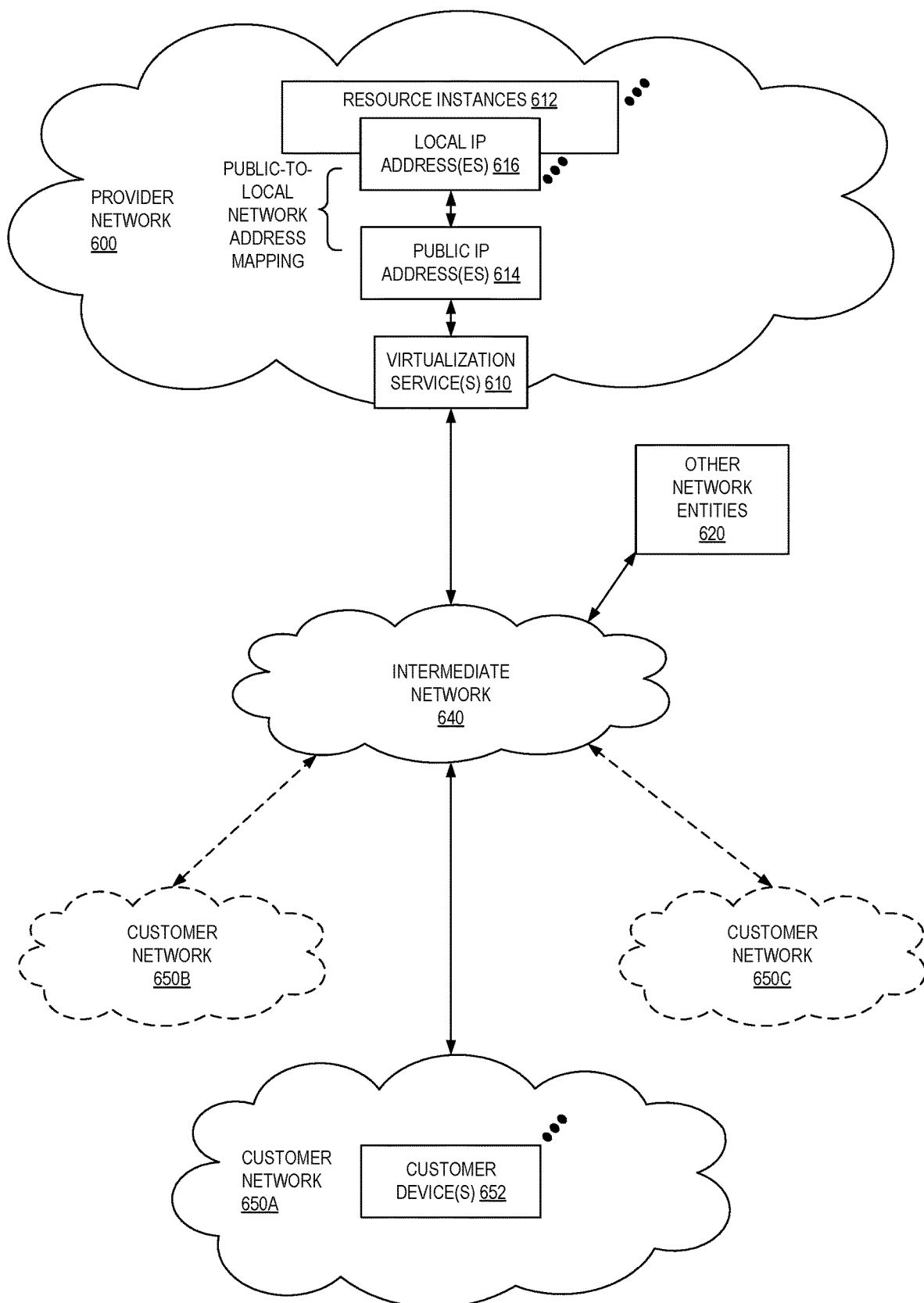
FIG. 6 illustrates an example provider network environment according to some embodiments.

As indicated above, in some embodiments, the launch of compute instances at one or more identified infrastructure locations can include configuring various resources defined in a virtual network template as part of the instance launch. As one example, the hardware virtualization service 602 or other control plane components of the cloud provider network 100 may determine whether there is a subnet associated with an infrastructure location at which one or more compute instances are to be launched (e.g., as illustrated in FIG. 6, the edge location 122A is associated with a subnet 420, whereas the edge location 122N is not yet associated with a subnet). If the subnet 420 did not yet exist, the hardware virtualization service 402 or other control plane components creates the subnet according to the configurations specified in the associated virtual network template.

The creation of the subnet, for example, may include the creation and storage of one or more objects representing the subnet to be stored in association with a corresponding user account. In the case that a subnet had not yet been created, the hardware virtualization service 402 may further cause the creation and configuration of similar resources corresponding to route tables (which may, for example, include sending instructions to configure a phantom router and various gateways associated the provider substrate extension, as described above, to configure routing to various types of networks), NACLs, security groups, and the like. Once such resources are created, the requested instances can be launched into the edge location 122A (or other selected location), including the assignment of an IP address from the corresponding subnet range to a virtual network interface associated with the instance.

As indicated above, an edge subnet or edge network (e.g., edge subnets 418A, 418N) is a virtual network control plane abstraction that may translate into per-infrastructure location subnets under the cover. These per-infrastructure location subnets may or may not be visible to customers. In some embodiments, components of the cloud provider network 100 control plane—e.g., a network manager—is tasked with taking a network prefix associated with an edge network and dividing the prefix into smaller, per-provider substrate extension location prefixes.

Figure 5:
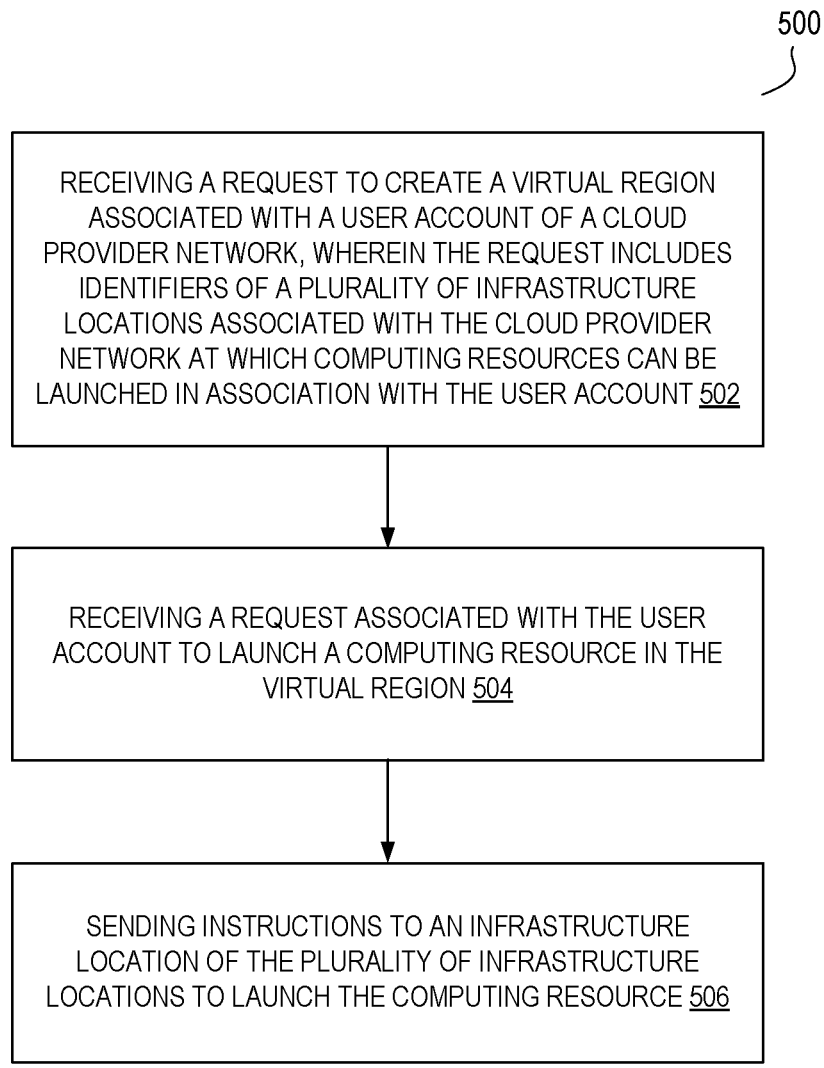
FIG. 5 is a flow diagram illustrating operations of a method for enabling users of a cloud provider network to create and use virtual regions according to some embodiments.

FIG. 5 is a flow diagram illustrating operations 500 of a method for enabling users of a cloud provider network to create and use virtual regions according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by a region service 102 of the other figures.

The operations 500 include, at block 502, receiving a request to create a virtual region associated with a user account of a cloud provider network, wherein the request includes identifiers of a plurality of infrastructure locations associated with the cloud provider network at which computing resources can be launched in association with the user account.

In some embodiments, the operations further include receiving a request to identify infrastructure locations satisfying one or more location parameters, wherein the one or more location parameters include at least one of: latency of data communications relative to a specified geographic area, types of available cloud provider network services, or presence in a legal jurisdiction; identifying one or more infrastructure locations associated with the cloud provider network satisfying the location parameters; and sending a response including identifiers of the one or more infrastructure locations.

In some embodiments, at least one first infrastructure location of the plurality of infrastructure locations is associated with a first region defined by the cloud provider network and at least one second infrastructure location of the plurality of infrastructure locations is associated with a second region defined by the cloud provider network.

The operations 500 further include, at block 504, receiving a request associated with the user account to launch a computing resource in the virtual region.

The operations 500 further include, at block 506, sending instructions to an infrastructure location of the plurality of infrastructure locations to launch the computing resource. In some embodiments, the computing resource is associated with a computing resource identifier from a unique identifier space associated with the virtual region. In some embodiments, the computing resource is a compute instance, wherein the request to launch the compute instance identifies an application profile including performance configurations related to execution of compute instances at infrastructure locations of the cloud provider network, and wherein a hardware virtualization service launches the compute instance according to the performance configurations.

In some embodiments, the request identifies the plurality of infrastructure locations based on specified location criteria, and the operations further include: identifying the plurality of infrastructure locations satisfying the specified location criteria, wherein the specified location criteria include at least one of: a legal jurisdiction in which the plurality of infrastructure locations are located, a latency profile for the plurality of infrastructure locations relative to a geographic location, or a type of cloud provider network service available at the plurality of infrastructure locations; storing, in association with the user account, data representing the second virtual region and including identifiers of the plurality of infrastructure locations.

In some embodiments, the operations further include receiving a request to describe the virtual region; and sending a response including an indication of an expected latency of network communications between respective infrastructure locations of the one or more infrastructure locations.

In some embodiments, the operations further include storing, in association with the user account, data representing the virtual region; receiving a request to add an infrastructure location to the virtual region; and adding an identifier of the infrastructure location to the data representing the virtual region. In some embodiments, the operations further include receiving a request to remove an infrastructure location from the virtual region; determining that an active computing resource exists in the infrastructure location; migrating the active computing resource to another infrastructure location of the virtual region; and removing an identifier of the infrastructure location from the data representing the virtual region.

In some embodiments, the at least one infrastructure location of the plurality of infrastructure locations is connected to a private network of a communications service provider and is controlled at least in part by a control plane service of a cloud provider network via a connection through at least a portion of the private network.

In some embodiments, the operations further include receiving a request to associate a subnet with the virtual region; and creating a subnet in association with at least one infrastructure location of the one or more infrastructure locations.

FIG. 6 illustrates an example provider network (or "service provider system") environment according to some embodiments. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 may be associated with the resource instances 612; the local IP addresses are the internal network addresses of the resource instances 612 on the provider network 600. In some embodiments, the provider network 600 may also provide public IP addresses 614 and/or public IP address ranges (e.g., Internet Protocol version 4 (IPv4) or Internet Protocol version 6 (IPv6) addresses) that customers may obtain from the provider 600.

Conventionally, the provider network 600, via the virtualization services 610, may allow a customer of the service provider (e.g., a customer that operates one or more client networks 650A-650C including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 640, such as the Internet. Other network entities 620 on the intermediate network 640 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
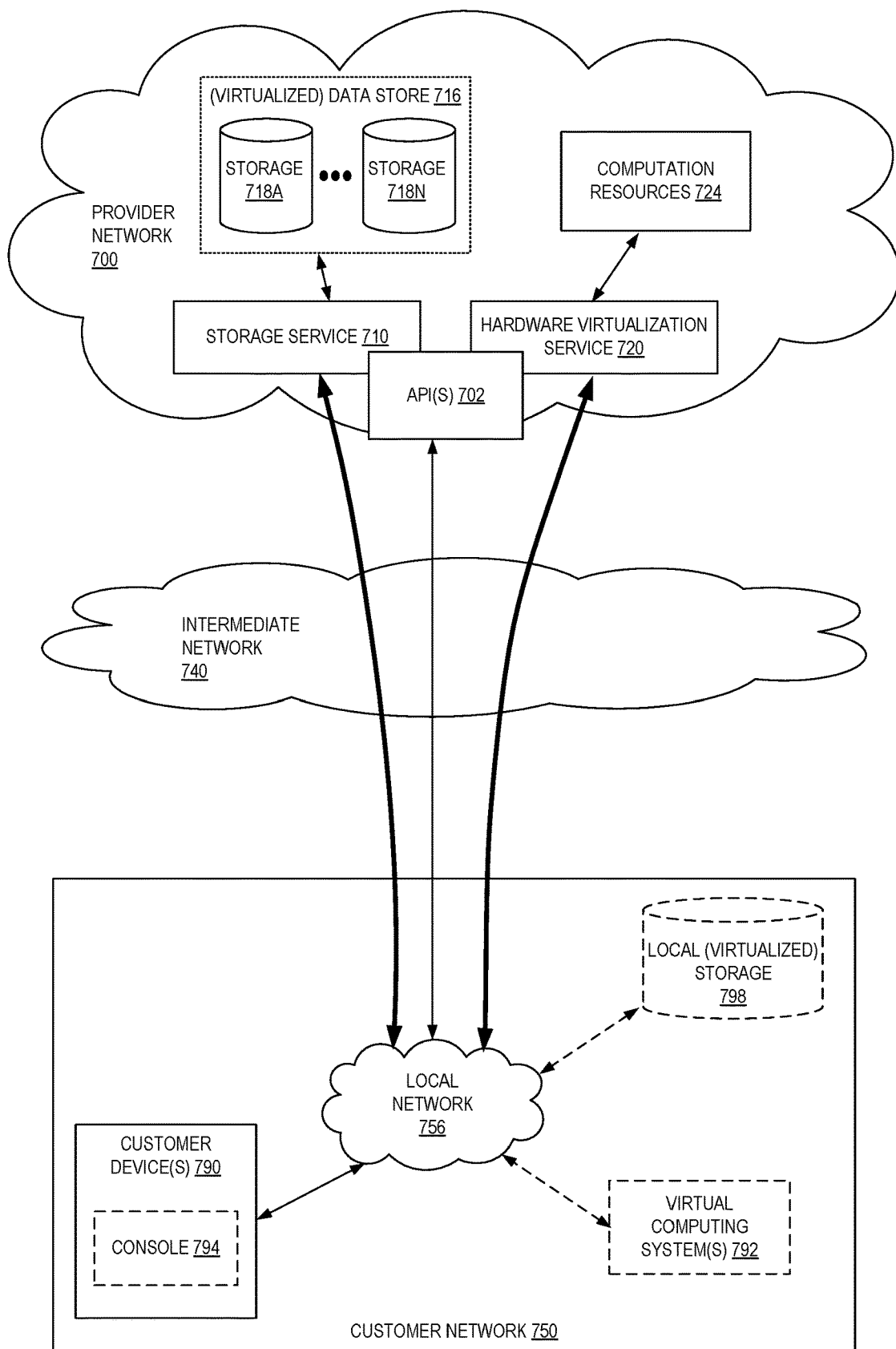
FIG. 7 is a block diagram of an example provider network that provides a storage service and a hardware virtualization service to customers according to some embodiments.

FIG. 7 is a block diagram of an example provider network that provides a storage service and a hardware virtualization service to customers, according to some embodiments. Hardware virtualization service 720 provides multiple computation resources 724 (e.g., VMs) to customers. The computation resources 724 may, for example, be rented or leased to customers of the provider network 700 (e.g., to a customer that implements customer network 750). Each computation resource 724 may be provided with one or more local IP addresses. Provider network 700 may be configured to route packets from the local IP addresses of the computation resources 724 to public Internet destinations, and from public Internet sources to the local IP addresses of computation resources 724.

Provider network 700 may provide a customer network 750, for example coupled to intermediate network 740 via local network 756, the ability to implement virtual computing systems 792 via hardware virtualization service 720 coupled to intermediate network 740 and to provider network 700. In some embodiments, hardware virtualization service 720 may provide one or more APIs 702, for example a web services interface, via which a customer network 750 may access functionality provided by the hardware virtualization service 720, for example via a console 794 (e.g., a web-based application, standalone application, mobile application, etc.). In some embodiments, at the provider network 700, each virtual computing system 792 at customer network 750 may correspond to a computation resource 724 that is leased, rented, or otherwise provided to customer network 750.

From an instance of a virtual computing system 792 and/or another customer device 790 (e.g., via console 794), the customer may access the functionality of storage service 710, for example via one or more APIs 702, to access data from and store data to storage resources 718A-718N of a virtual data store 716 (e.g., a folder or "bucket", a virtualized volume, a database, etc.) provided by the provider network 700. In some embodiments, a virtualized data store gateway (not shown) may be provided at the customer network 750 that may locally cache at least some data, for example frequently-accessed or critical data, and that may communicate with storage service 710 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes via storage service 710 acting as a storage virtualization service, and these volumes may appear to the user as local (virtualized) storage 798.

While not shown in FIG. 7, the virtualization service(s) may also be accessed from resource instances within the provider network 700 via API(s) 702. For example, a customer, appliance service provider, or other entity may access a virtualization service from within a respective virtual network on the provider network 700 via an API 702 to request allocation of one or more resource instances within the virtual network or within another virtual network.

Figure 8:
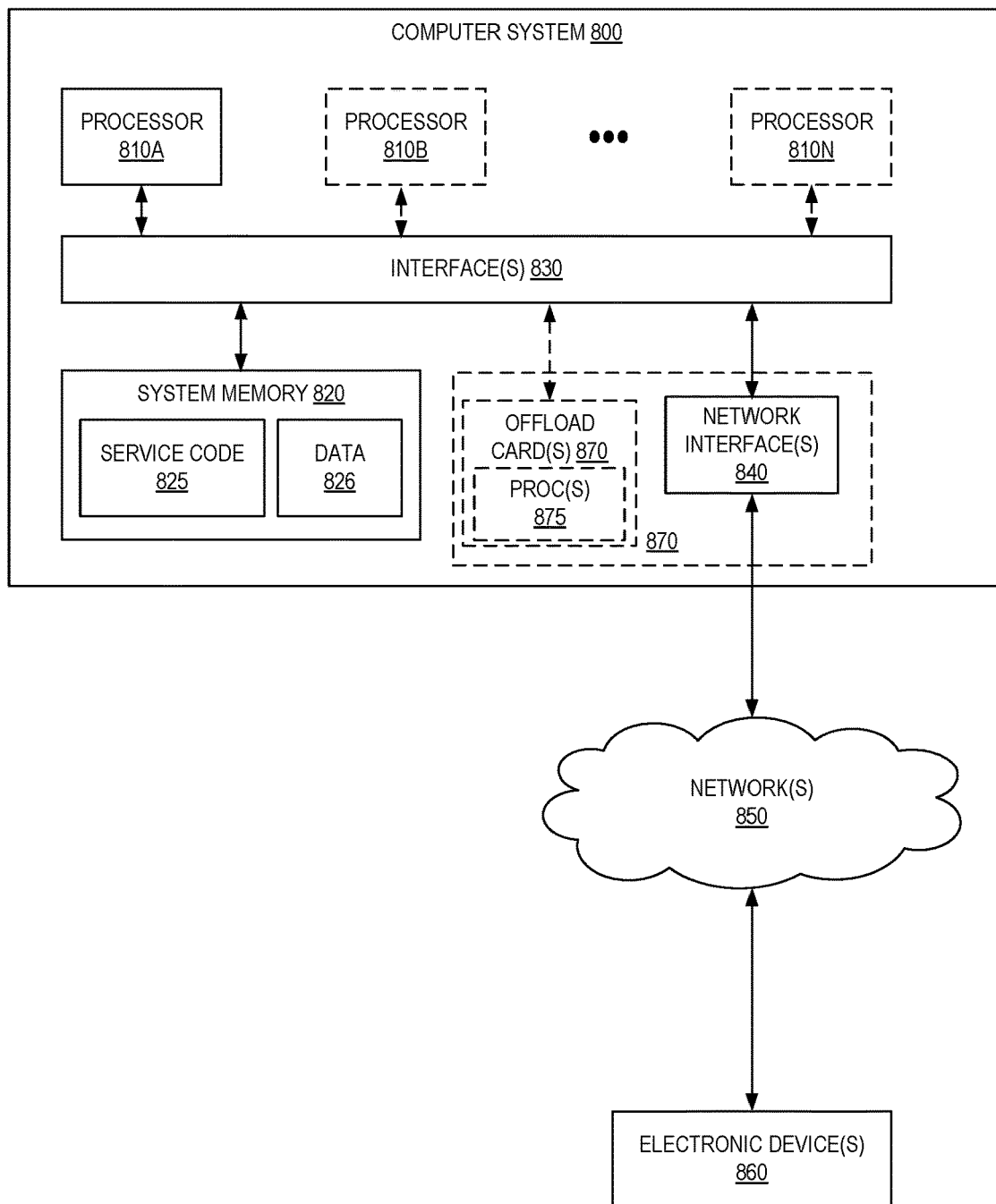
FIG. 8 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 800 illustrated in FIG. 8. In the illustrated embodiment, computer system 800 includes one or more processors 810 coupled to a system memory 820 via an input/output (I/O) interface 830. Computer system 800 further includes a network interface 840 coupled to I/O interface 830. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 810 may commonly, but not necessarily, implement the same ISA.

System memory 820 may store instructions and data accessible by processor(s) 810. In various embodiments, system memory 820 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 820 as service code 825 and data 826.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices as illustrated in FIG. 1, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 800 includes one or more offload cards 870 (including one or more processors 875, and possibly including the one or more network interfaces 840) that are connected using an I/O interface 830 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 800 may act as a host electronic device (e.g., operating as part of a hardware virtualization service) that hosts compute instances, and the one or more offload cards 870 execute a virtualization manager that can manage compute instances that execute on the host electronic device. As an example, in some embodiments the offload card(s) 870 can perform compute instance management operations such as pausing and/or un-pausing compute instances, launching and/or terminating compute instances, performing memory transfer/copying operations, etc. These management operations may, in some embodiments, be performed by the offload card(s) 870 in coordination with a hypervisor (e.g., upon a request from a hypervisor) that is executed by the other processors 810A-810N of the computer system 800. However, in some embodiments the virtualization manager implemented by the offload card(s) 870 can accommodate requests from other entities (e.g., from compute instances themselves), and may not coordinate with (or service) any separate hypervisor.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or nonvolatile media such as RAM (e.g., SDRAM, double data rate (DDR) SDRAM, SRAM, etc.), read only memory (ROM), etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 718A-718N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving, by a component of a cloud provider network, a request to create a virtual region associated with a user account of the cloud provider network, wherein the request includes identifiers of a plurality of infrastructure locations associated with the cloud provider network at which computing resources can be launched in association with the user account, wherein each infrastructure location of the plurality of infrastructure locations represents a geographic area at which computing hardware exists that is used by the cloud provider network to provide computing services, and wherein at least one first infrastructure location of the plurality of infrastructure locations is associated with a first region defined by the cloud provider network and at least one second infrastructure location of the plurality of infrastructure locations is associated with a second region defined by the cloud provider network;
   storing, in association with the user account, data representing the virtual region and including a virtual region identifier;
   receiving a request associated with the user account to launch a computing resource in at an infrastructure location of the virtual region;
   sending instructions to an infrastructure location of the plurality of infrastructure locations to launch the computing resource, wherein the infrastructure location receives the instructions to launch the computing resource and launches the computing resource;
   receiving a request to remove an infrastructure location from the virtual region;
   determining that an active computing resource exists in the infrastructure location;
   migrating the active computing resource to another infrastructure location of the virtual region; and
   removing an identifier of the infrastructure location from the data representing the virtual region.

2. The computer-implemented method of claim 1, further comprising:
   receiving a request to identify infrastructure locations satisfying one or more location parameters, wherein the one or more location parameters include at least one of: latency of data communications relative to a specified geographic area, types of available cloud provider network services, or presence in a legal jurisdiction;
   identifying one or more infrastructure locations associated with the cloud provider network satisfying the location parameters; and
   sending a response including identifiers of the one or more infrastructure locations.

3. The computer-implemented method of claim 1, further comprising:
   receiving a request to describe the virtual region; and
   sending a response including an indication of an expected latency of network communications between respective infrastructure locations of the plurality of infrastructure locations.

4. A computer-implemented method comprising:
   receiving a request to create a virtual region associated with a user account of a cloud provider network, wherein the request includes identifiers of a plurality of infrastructure locations associated with the cloud provider network at which computing resources can be launched in association with the user account, wherein each infrastructure location of the plurality of infrastructure locations represents a geographic area at which computing hardware exists that is used by the cloud provider network to provide computing services;
   storing, in association with the user account, data representing the virtual region;
   receiving a request associated with the user account to launch a computing resource in the virtual region;
   sending instructions to an infrastructure location of the plurality of infrastructure locations to launch the computing resource, wherein the infrastructure location receives the instructions to launch the computing resource and launches the computing resource;
   receiving a request to remove an infrastructure location from the virtual region;
   determining that an active computing resource exists in the infrastructure location;
   migrating the active computing resource to another infrastructure location of the virtual region; and
   removing an identifier of the infrastructure location from the data representing the virtual region.

5. The computer-implemented method of claim 4, further comprising:
   receiving a request to identify infrastructure locations satisfying one or more location parameters, wherein the one or more location parameters include at least one of: latency of data communications relative to a specified geographic area, types of available cloud provider network services, or presence in a legal jurisdiction;
   identifying one or more infrastructure locations associated with the cloud provider network satisfying the location parameters; and
   sending a response including identifiers of the one or more infrastructure locations.

6. The computer-implemented method of claim 4, further comprising:
   receiving a request to describe the virtual region; and sending a response including an indication of an expected latency of network communications between respective infrastructure locations of the plurality of infrastructure locations.

7. The computer-implemented method of claim 4, wherein the computing resource is associated with a computing resource identifier from a unique identifier space associated with the virtual region.

8. The computer-implemented method of claim 4, further comprising:
   storing, in association with the user account, data representing the virtual region;
   receiving a request to add an infrastructure location to the virtual region; and
   adding an identifier of the infrastructure location to the data representing the virtual region.

9. The computer-implemented method of claim 4, wherein the computing resource is a compute instance, wherein the request to launch the compute instance identifies an application profile including performance configurations related to execution of compute instances at infrastructure locations of the cloud provider network, and wherein a hardware virtualization service launches the compute instance according to the performance configurations.

10. The computer-implemented method of claim 4, wherein at least one first infrastructure location of the plurality of infrastructure locations is associated with a first region defined by the cloud provider network and at least one second infrastructure location of the plurality of infrastructure locations is associated with a second region defined by the cloud provider network.

11. The computer-implemented method of claim 4, wherein the request identifies the plurality of infrastructure locations based on specified location criteria, and wherein the method further comprises:
   identifying the plurality of infrastructure locations satisfying the specified location criteria, wherein the specified location criteria include at least one of a legal jurisdiction in which the plurality of infrastructure locations are located, a latency profile for the plurality of infrastructure locations relative to a geographic location, or a type of cloud provider network service available at the plurality of infrastructure locations; and
   storing, in association with the user account, data representing the virtual region and including identifiers of the plurality of infrastructure locations.

12. The computer-implemented method of claim 4, wherein at least one infrastructure location of the plurality of infrastructure locations is connected to a private network of a communications service provider and is controlled at least in part by a control plane service of a cloud provider network via a connection through at least a portion of the private network.

13. The computer-implemented method of claim 4, further comprising:
   receiving a request to associate a virtual network or subnet with the virtual region; and
   creating a virtual network or subnet in association with at least one infrastructure location of the one or more infrastructure locations comprising the virtual region.

14. A system comprising:
   a first one or more electronic devices to implement a regions service in a cloud provider network, the regions service including instructions that upon execution cause the regions service to:
      receive a request to create a virtual region associated with a user account of a cloud provider network, wherein the request includes identifiers of a plurality of infrastructure locations associated with the cloud provider network at which computing resources can be launched in association with the user account, wherein each infrastructure location of the plurality of infrastructure locations represents a geographic area at which computing hardware exists that is used by the cloud provider network to provide computing services,
      store, in association with the user account, data representing the virtual region,
      receive a request associated with the user account to launch a computing resource in the virtual region,
      send instructions to an infrastructure location of the plurality of infrastructure locations to launch the computing resource,
      receive a request to remove an infrastructure location from the virtual region,
      determine that an active computing resource exists in the infrastructure location,
      migrate the active computing resource to another infrastructure location of the virtual region, and
      remove an identifier of the infrastructure location from the data representing the virtual region; and
   a second one or more electronic devices to implement an infrastructure location of the cloud provider network, the infrastructure location including instructions that upon execution cause the infrastructure location to:
      receive the instructions to launch the computing resource, and
      launch the computing resource.

15. The system of claim 14, wherein the instructions upon execution further cause the regions service to:
   receive a request to identify infrastructure locations satisfying one or more location parameters, wherein the one or more location parameters include at least one of: latency of data communications relative to a specified geographic area, types of available cloud provider network services, or presence in a legal jurisdiction;
   identify one or more infrastructure locations associated with the cloud provider network satisfying the location parameters; and
   send a response including identifiers of the one or more infrastructure locations.

16. The system of claim 14, wherein the instructions upon execution further cause the regions service to:
   receive a request to describe the virtual region; and
   send a response including an indication of an expected latency of network communications between respective infrastructure locations of the plurality of infrastructure locations.

17. The system of claim 14, wherein the computing resource is associated with a computing resource identifier from a unique identifier space associated with the virtual region.

18. The system of claim 14, wherein the instructions upon execution further cause the regions service to:
   store, in association with the user account, data representing the virtual region;
   receive a request to add an infrastructure location to the virtual region; and
   add an identifier of the infrastructure location to the data representing the virtual region.

* * * * *